United States Patent
Wanlass

[15] 3,679,966
[45] July 25, 1972

[54] CLOSED LOOP PARAMETRIC VOLTAGE REGULATOR

[72] Inventor: Cravens L. Wanlass, Santa Ana, Calif.
[73] Assignee: Ambac Industries, Incorporated
[22] Filed: July 31, 1968
[21] Appl. No.: 749,198

[52] U.S. Cl................................323/56, 323/60, 336/170, 336/215
[51] Int. Cl..........................................G05f 1/32
[58] Field of Search.....................323/6, 44, 45, 48, 56, 60, 323/57, 66; 336/170, 215

[56] References Cited

UNITED STATES PATENTS

| | | |
|---|---|---|
| 2,694,177 | 11/1954 | Sola..........................................323/60 |
| 2,976,478 | 3/1961 | Aske....................................336/170 X |
| 3,087,108 | 4/1963 | Toffolo et al. ............................323/56 |
| 3,443,198 | 5/1969 | Wanlass..............................323/56 X |

Primary Examiner—A. D. Pellinen
Attorney—Lyon & Lyon

[57] ABSTRACT

A parametric voltage regulator in which the inductance component of the resonant circuit of a parametric device is varied in response to changes in the output voltage, caused for example by changes in line frequency, to maintain the output voltage constant. The inductance is preferably changed by providing an external flux generator on the core of the parametric device to vary the reluctance of a part of the core, but can also be accomplished by the use of a separate inductor in the resonant circuit.

3 Claims, 2 Drawing Figures

PATENTED JUL 25 1972 3,679,966

INVENTOR
CRAVENS L. WANLASS
BY
Lyon & Lyon
ATTORNEYS

3,679,966

CLOSED LOOP PARAMETRIC VOLTAGE REGULATOR

BACKGROUND OF THE INVENTION

In U.S. Pat. application Ser. No. 589,780, filed Oct. 25, 1966, by Leslie Kent Wanlass, and assigned to the assignee of the present application, there is disclosed a voltage regulator employing a parametric circuit for providing a regulated output voltage from an unregulated A.C. input voltage. The parametric circuit in that application comprises an L-C circuit, the inductance component of which is a variable inductor device of the type disclosed in U.S. Pat. No. 3,403,323, and also assigned to the assignee of the present invention. The theoretical considerations and operating principles of this variable inductor and of the parametric circuit are described in detail in these applications, the disclosures of which are incorporated by reference herein. Briefly, the variable inductor disclosed in U.S. Pat. No. 3,403,323 comprises a magnetic core having a pair of windings thereon. The core is constructed so that it has four common regions or "legs" and two end or joining portions for magnetically coupling the common regions. The coils are wound on the end portions with their axes displaced at 90° so that normally there is no inductive coupling between them, and so that the flux components generated as a result of passing currents through the two windings are at all times in opposing relationship in two of the legs and in additive relationship in the other two legs. As a result of this construction, current in one of the windings, referred to as the control winding, generates a magnetic flux which controls the reluctance of the magnetic circuit encompassed by the second winding, referred to as the load winding, in such a manner that variations in this flux caused by variation in the current in the control winding cause the hysteresis loop of the magnetic circuit encompassed by the load winding to be effectively rotated, thereby varying the inductance of the load winding. Because of the construction of the device, the inductance varies at twice the frequency of an alternating current applied to the control winding.

This phenomenon is utilized in the parametric circuit disclosed in application Ser. No. 589,780. In that application, a capacitor is coupled to the load winding of the variable inductor to form a resonant circuit. Energy is transferred to the resonant circuit by pumping the control winding with an alternating current of the same frequency as that to which the resonant circuit is tuned, that is, the output frequency. Once the parametric circuit builds up to its stable oscillating point, variations in magnitude of the pumping source do not appreciably affect its output. Therefore, by coupling the line to be regulated to the control winding of the inductance device, a regulated, almost perfect sine wave, displaced 90° in phase with the input, can be taken from the resonant circuit. Since there is no direct transformer coupling between the windings, the device serves as a bilateral filter, removing transients and noise generated in either the line or the load.

While the parametric regulator is extremely satisfactory where the frequency of the input voltage is relatively constant, its output is frequency sensitive. Thus, while the regulator presents no problems in normal use, for example, where the input is taken from the lines of a utility company, regulation problems do arise where the input to the circuit is derived from field generators or the like whose output frequency is not closely controlled. This same problem exists to some extent with relation to output voltage as a function of output current or load regulation as it is commonly referred to in practice.

SUMMARY OF THE INVENTION

According to the present invention, a parametric regulator has been provided which is not frequency sensitive or load sensitive. This is accomplished by sensing the output voltage and developing a feedback signal which controls one of the reactance components of the resonant circuit of the parametric device of application Ser. No. 589,780. Since the output voltage is dependent upon the input frequency and the values of the reactive components of the resonant circuit, any changes in voltage caused by a change in frequency can be compensated for by changing a parameter in the resonant circuit. Preferably, it is the inductive reactance which is varied and this may be achieved by attaching to the core of the parametric device an additional core and winding which serve to introduce an external flux into the core and change its reluctance, thereby changing the inductance of the load winding.

It is therefore an object of the present invention to provide a closed loop parametric voltage regulator which is insensitive to changes in input frequency or any other parameter affecting the output voltage value.

It is also an object of the present invention to provide a closed loop parametric voltage regulator in which the output voltage value can be changed as desired.

DESCRIPTION OF THE INVENTION

Figure 1:
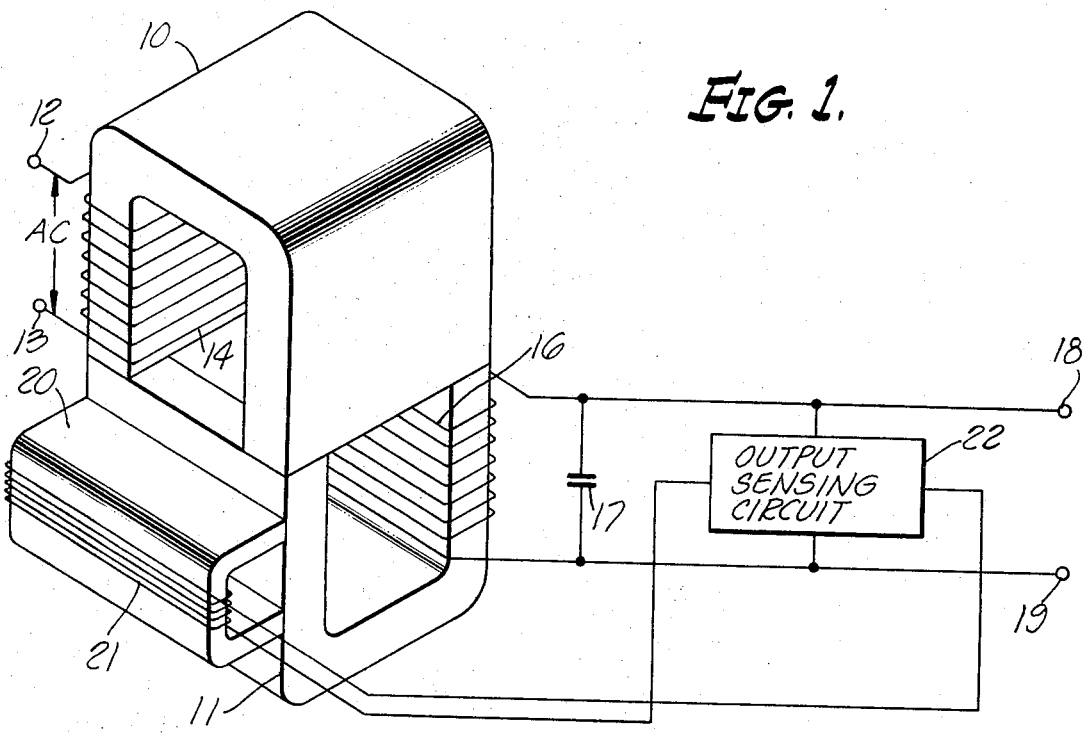
FIG. 1 is a perspective view of a voltage regulator according to the present invention.

In the drawings, the convention adopted in the aforementioned applications for indicating a core according to the teachings of application U.S. Pat. No. 3,403,323 are followed, that is, such a core is indicated by the use of a T-shaped iron symbol. While any of the various core structures illustrated and described in that application could be used in this invention, the preferred construction is similar to that shown in FIG. 7 of that application, that is, a core made up of two C-cores 10 and 11 rotated 90° from each other and joined at their bases, as shown in FIG. 1.

In FIG. 1, an unregulated A.C. input voltage is applied to terminals 12 and 13. The control winding 14 of the variable inductor is connected across the input terminals 12 and 13. The load winding 16 of the inductor has a capacitor 17 coupled thereacross to form a resonant circuit. The resonant circuit 16, 17 is preferably tuned to the frequency of the input voltage. Output terminals 18 and 19 are coupled across the resonant circuit 16, 17. As shown, the output terminals 18 and 19 are coupled across the entirety of the winding 16. If desired, these load terminals may be connected across only a portion of the winding 16 with the capacitor connected across the entirety of the winding 16 to permit the capacitor 17 to be operated at a higher voltage where it is more efficient while maintaining the voltage across the load at a lower value.

A third C-core 20 is mounted on the core 11. As shown, the opening of the core 20 runs parallel to the opening of the core 11. If desired, however, the openings of the cores 20 and 11 could be at right angles. The core 20 could also be any desired shape and need not be a C-core. A control winding 21 is wound on the core 20 and is connected to the output of an output sensing and control circuit 22 which is connected across the output terminals 18 and 19 and produces an output voltage representative of the voltage appearing across the terminals 18 and 19. The output sensing and control circuit can be of any known type, for example, it can be similar to that disclosed in my U.S. Pat. No. 3,409,822 assigned to the assignee of the present application.

In operation, a current passed through the control winding 21 on the core 20 causes an external flux to pass through the portion of the core 11 underneath the core 20. This varies the reluctance of the magnetic circuit encompassed by the load winding 16 and thus varies its effective inductance. If greater control is required, a second core such as the core 20 could be provided on the core 11 and having a winding connected in parallel or series with the winding 21. In order to have maximum effect, the control core or cores should be positioned on the C-core on which is wound the load winding. Assume that the output voltage decreases due to a decrease in input frequency. In this case the sensing circuit 22 would deliver less current to the winding 21 on the core 20. This decrease in current in the winding 21 causes an increase in the effective inductance of the winding 16. This increase in inductance in turn causes an increase in the output voltage. If the output voltage increases due to an increase in line frequency, or for some other reason, the current fed back to the winding 21 is increased, reducing the inductance of the winding 16 which results in a reduction in the output voltage.

Figure 2:
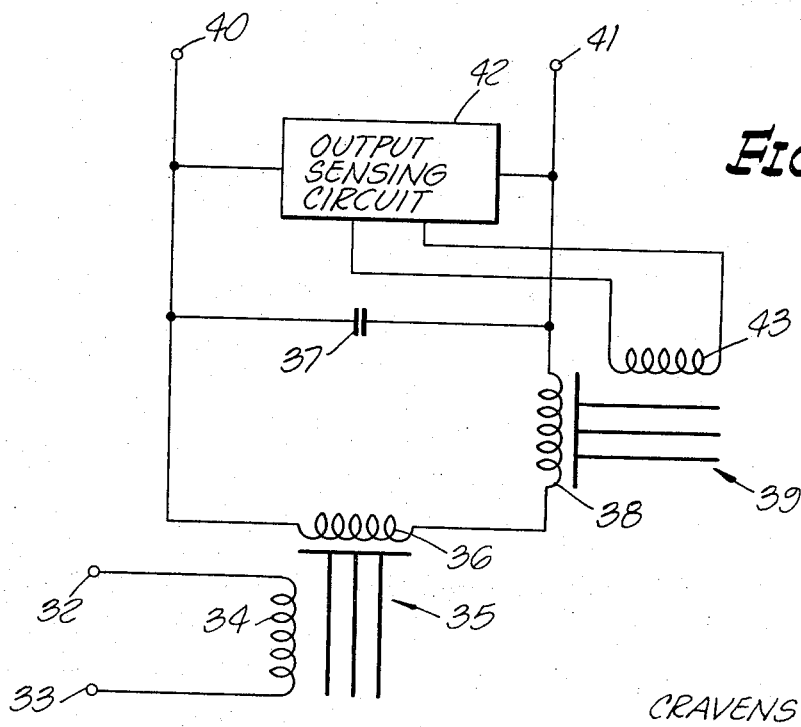
FIG. 2 is a schematic diagram of another embodiment of the voltage regulator of the present invention.

FIG. 2 shows a modification of the voltage regulating circuit of the present invention. In this figure input terminals 32 and 33 are connected to the control winding 34 of an inductor of the type described 35. The load winding 36 of the inductor 35 is connected to a capacitor 37 and the load winding 38 of a second variable inductor 39 of the type described. Output terminals 40 and 41 are connected across the capacitor 37 and the output voltage appearing across these terminals is sensed by an output sensing circuit 42. The output of the output sensing and control circuit, which is representative of the voltage appearing across the terminals 40 and 41, is connected to the control winding 43 of the inductor 39. The operation of this circuit is substantially identical to that of the circuit shown in FIG. 1, a change in the inductance of the load winding 38 resulting in a change in the output voltage.

While the voltage regulator of the present invention has been illustrated as incorporating circuitry for varying the inductance in the resonant circuit of the parametric device, it should be understood that since the output voltage is a function of frequency and the inductance and capacitance in the resonant circuit, the invention could also be practiced by providing a variable capacitance in the resonant circuit whose capacitance is controlled by a suitable feedback circuit.

The regulator of this invention, being a closed loop system rather than an open loop system as is the regulator shown in application Ser. No. 589,780, provides several advantages. Regulation is obtained despite changes in line frequency, load current, line voltage or any other item which affects the output voltage. Because of the use of the feedback circuit, a passive filter can be used in the output circuit to reduce waveform distortion. The input to the feedback circuit can be remotely located from the regulating device itself and thus a constant output voltage can be obtained at the load regardless of such factors as line drop, etc. By using different types of sensors, different types of regulation such as rms and average can be obtained. The response time of the circuit is very rapid and the same filtering characteristics are present as in the basic parametric regulator. In the event that the control circuit fails, the system will operate open loop and as such will provide fairly accurate regulation even with line frequency changes and thus will prevent damage to the equipment to which it is connected. By providing a potentiometer or the like in the output sensing circuit, the output voltage can be made adjustable. Because of the fact that the feedback winding of the device has inductance of sufficient magnitude, control can be exercised by a pulse width modulation of current. The inductance of the feedback winding will smooth out these pulses and establish a D.C. control current which is the average of the pulse width modulation.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A voltage regulator comprising:
   an input circuit adapted to be connected to a source of A.C. voltage;
   a variable inductor comprising a first magnetic core having four common regions and two end regions magnetically joining said common regions, a load winding wound on said core and encompassing a magnetic circuit therein, the effective reluctance of said magnetic circuit controlling the inductance of said load winding, and a control winding wound on said core, said control winding being responsive to current therein for controlling the effective reluctance of said magnetic circuit whereby variations in said current vary the inductance of said load winding at twice the frequency of said current;
   a second magnetic core mounted on said first core and having a winding thereon, a current in said winding affecting the reluctance of said magnetic circuit and hence the inductance of said load winding;
   means coupling said control winding to said input circuit;
   a capacitor connected to said load winding to form a resonant circuit therewith;
   an output circuit coupled to said resonant circuit;
   a sensing circuit coupled to said output circuit for producing a control voltage representative of the voltage in said output circuit; and
   means coupling said control voltage to said winding on said second core.

2. The regulator of claim 1, wherein said second core is a C-core mounted on one of said end regions.

3. The regulator of claim 2, wherein said first core comprises a pair of C-cores rotated 90° and joined at their bases.

* * * * *